United States Patent Office 3,123,531
Patented Mar. 3, 1964

3,123,531
SHAMPOO COMPOSITION COMPRISING BETA-DI-ALKYLAMINOETHYL-3-PHENYLSALICYLATE
Melville Sahyun, 316 Castillo St., Santa Barbara, Calif.
No Drawing. Filed Mar. 8, 1960, Ser. No. 13,425
5 Claims. (Cl. 167—87)

This invention relates to a shampoo useful for the management of seborrhea of the scalp (dandruff) and is more particularly concerned with a shampoo composition containing, as its active ingredient, a salt of an aminoalkyl ester of phenylsalicyclic acid.

There are a number of shampoo compositions alleged to be useful in the management of dandruff. Many of them contain sulfur compounds or other evil smelling ingredients, which cannot be masked by perfumes, which make them distasteful to the user. Many cause irritation to the skin or scalp, and to the eyes.

It is an object of the present invention to provide a shampoo composition which will be effective in the management and alleviation of dandruff (seborrhea of the scalp), i.e. which relieves the itching and clears the seborrheic scaling, which is non-toxic, relatively non-irritating to the eye, does not irritate the skin and scalp, has no unpleasant smell and lends itself to the addition of perfumes, i.e. is effective and yet cosmetically acceptable.

The shampoo composition of the present invention is basically a conventional shampoo of the type that foams and forms a good lather when worked into the hair with added water, to which is added an effective amount of the active ingredient.

The active ingredient useful in the shampoo composition of the present invention is a compound having the formula

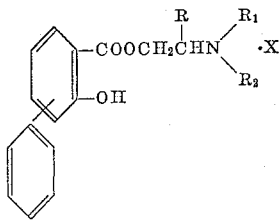

wherein

R represents hydrogen or methyl;
$R_1$ and $R_2$ each represent methyl, ethyl or isopropyl;
X represents a pharmaceutically acceptable non-toxic salt (either acid addition or quaternary ammonium);
and, wherein the phenyl group is attached to the 3, 4 or 5 position of the salicylate ring.

While all the above compounds are useful in the shampoo, the preferred embodiment is that wherein R is hydrogen, $R_1$ and $R_2$ each represent ethyl and X is an acid addition salt and wherein the phenyl group is attached to the 3 position of the salicylate ring, i.e. a beta-diethylaminoethyl 3-phenylsalicylate acid addition salt.

The portion of the shampoo is merely a conventional foaming-type shampoo and it may be in the form of a clear liquid shampoo, a liquid cream shampoo, a soft cream shampoo, or a cream ointment or any of the usual forms. The shampoo ingredients are either of the natural detergent (soap) or synthetic detergent varieties.

Synthetic detergent shampoo bases are preferred for their ease of removal from the hair by rinsing without leaving any undesired films. However, for use by persons having very oily scalps and hair, a soap base may be preferred for adequate foaming.

The active ingredient is incorporated into the shampoo base by admixing it. All the compounds which may be used as the active ingredient are soluble in water and in the shampoo bases which contain some water. While the amount of active ingredient to be used can vary, for normal shampoo application, an amount equal to about 1 percent of the shampoo base seems best.

The compounds useful as the active ingredient in the shampoo compositions of the present invention include the acid addition and quaternary ammonium salts: of beta-diethylaminoethyl 3(or 4 or 5)-phenylsalicylic acid; of beta-diethylaminoisopropyl 3(or 4 or 5)-phenylsalicylic acid; of beta-dimethylaminoethyl 3(or 4 or 5)-phenylsalicylic acid; of beta-dimethylaminoisopropyl 3(or 4 or 5)-phenylsalicylic acid; of beta-diisopropylaminoethyl 3(or 4 or 5)-phenylsalicylic acid; of beta-diisopropylaminoisopropyl 3(or 4 or 5)-phenylsalicylic acid. The particular acid addition salt or quaternary ammonium salt may be that of any of the water-soluble, non-toxic salts commonly used e.g. acid addition salts derived from mineral acid such as hydrochloric acid, hydrobromic acid, hydroiodic acid, nitric acid, phosphoric acid, sulfuric acid and the like; and derived from organic acids such as acetic acid, citric acid, tartaric acid, lactic acid, and the like, giving the hydrochloride, hydrobromide, hydroiodide, nitrate, phosphate or acid phosphate, sulfate or bisulfate, acetate, citrate or acid citrate, tartrate or bitartrate respectively. Examples of some of the quaternary ammonium salts include the methochloride, methobromide, methoiodide, ethobromide, propobromide, benzochloride, benzobromide, methosulfate, methobenzenesulfonate and metho-p-toluenesulfonate.

The free bases of the salts useful as the active ingredient in the shampoo composition of the present invention are well known as are many of the salts. Methods of conversion from one salt form to another are also well known to the art.

Various shampoo formulations will now be illustrated, using beta-diethylaminoethyl-3 phenylsalicylate as the active ingredient, it being understood that any of the other herein described active ingredients may be substituted therefor.

EXAMPLE 1

*Clear Liquid Shampoo*

Ingredients: Per 100 cc.
(1) Sodium lauryl sulfate _____ grams__ 33.0
(2) Oleyl alcohol _____ do____ 0.6
(3) Ethanol _____ do____ 1.4
(4) Triethanolamine _____ do____ 0.4
(5) Beta-diethylaminoethyl 3-phenylsalicylate HCl _____ grams__ 1.0
(6) 1 percent aqueous solution of methylcellulose, C.P. 4000, q.s. _____ cc__ 100.0
Perfume if desired.

PROCEDURE

Prepare a stock solution of 1 percent methylcellulose, C.P. 4000, as follows: To 800 cc. of boiling distilled water, add 10 grams of methylcellulose, C.P. 4000, and stir. On cooling, add distilled water to make up to 1 liter.

Into a container, introduce sodium lauryl sulfate and triethanolamine, and heat to about 80 degrees centigrade. Cool to about 50 degrees centigrade. Dissolve beta-diethylaminoethyl 3-phenylsalicylate hydrochloride in about 50 cc. of stock solution and add to mixture containing sodium lauryl sulfate and triethanolamine. Finally add ethanol and oleyl alcohol (if the addition of perfume is desired, it is incorporated in this mixture when the temperature is 40 degrees centigrade or less, followed by thorough stirring). Make volume up to 100 cc. by adding the necessary amount of stock solution.

The above formulation gives a clear, liquid shampoo containing one percent of β-diethylaminoethyl 3-phenylsalicylate·HCl, at about pH 5.0 to pH 7.0.

EXAMPLE 2

Liquid Cream Shampoo

| Ingredients: | | Per 100 cc. |
|---|---|---|
| (1) Sodium lauryl sulfate | grams | 49.0 |
| (2) Polyethylene glycol 400 distearate | do | 2.0 |
| (3) Magnesium stearate | do | 1.5 |
| (4) Oleyl alcohol | do | 1.0 |
| (5) Beta-diethylaminoethyl 3-phenylsalicylate hydrochloride | do | 1.0 |
| (6) Distilled water, q.s | cc | 100.0 |
| (Perfume if desired.) | | |

PROCEDURE

Into a suitable container, introduce sodium lauryl sulfate, polyethylene glycol 400 distearate, and oleyl alcohol. Heat to about 85 degrees centigrade. While stirring, add magnesium stearate. When the mixture is a homogeneous mass, cool slowly with continued stirring. As the temperature reaches 50 to 60 degrees centigrade, add the distilled water (in which beta-diethylaminoethyl 3-phenylsalicylate had been dissolved) with stirring. A white creamy emulsion is formed. If perfume is desired, it is added when the temperature of the creamy mass is 40 degrees centigrade, with thorough gentle stirring.

EXAMPLE 3

Soft Cream

| Ingredients: | | Per 100 grams |
|---|---|---|
| (1) Stearic acid | grams | 3.5 |
| (2) Glycerin | do | 8.0 |
| (3) Potassium hydroxide | do | 0.2 |
| (4) Ethanol | do | 8.0 |
| (5) Lanolin | do | 2.0 |
| (6) Beta-diethylaminoethyl 3-phenylsalicylate hydrochloride | do | 1.0 |
| (7) Distilled water | cc | 77.3 |
| (Perfume if desired.) | | |

PROCEDURE (1) Melt the stearic acid and lanolin at a temperature of 85 degrees centigrade.

(2) Dissolve the remaining ingredients (perfume excepted) in the water. Heat to 65 degrees centigrade.

Add mixture 2 to mixture 1 while stirring gently and until a glistening cream is obtained. If perfume is desired, add it to the cream when the temperature is 40 degrees centigrade or less.

EXAMPLE 4

Cream Ointment

| Ingredients: | | Per 100 grams |
|---|---|---|
| (1) Stearic acid | grams | 18.0 |
| (2) Potassium carbonate | do | 1.0 |
| (3) Glycerin | do | 5.0 |
| (4) Beta-diethylaminoethyl 3-phenylsalicylate hydrochloride | do | 1.0 |
| (5) Distilled water | cc | 75.0 |
| (Perfume if desired.) | | |

PROCEDURE

Melt the stearic acid on a water bath and heat to a temperature of 85 degrees centigrade. Dissolve the remaining ingredients in the water (perfume excepted). Heat to 85 degrees centigrade. Add the latter mixture to the melted stearic acid while stirring briskly and until a glistening cream is obtained. If perfume is desired, add it to the cream, while stirring, when the temperature is 40 degrees centigrade or less.

EXAMPLE 5

Cream Ointment

| Ingredients: | | Per 100 grams |
|---|---|---|
| (1) Stearic acid | grams | 15.0 |
| (2) Glycerin | do | 5.5 |
| (3) Distilled water | cc | 74.0 |
| (4) Beta-diethylaminoethyl 3-phenylsalicylate hydrochloride | gram | 1.0 |
| (5) Sodium borate | do | 0.5 |
| (6) Potassium carbonate | do | 1.0 |
| (Perfume if desired.) | | |

PROCEDURE

Prepare as directed in Example 4.

The shampoos of Examples 3, 4, and 5 could be filled into collapsible tubes.

The shampoo compositions of Examples 1–5 were repeated, except, in place of the beta-diethylaminoethyl 3-phenylsalicylate·HCl, the same amount of one of the following compounds was substituted:

$\beta$-dimethylaminoethyl 3-phenylsalicylate·HCl,
$\beta$-diethylaminoethyl 4-phenylsalicylate·HCl,
$\beta$-diethylaminoethyl 5-phenylsalicylate·HCl,
$\beta$-dimethylaminoisopropyl 5-phenylsalicylate·HCl,
$\beta$-diethylaminoethyl 5-phenylsalicylate methobromide,
$\beta$-diethylaminoethyl 3-phenylsalicylate methobromide,
$\beta$-diethylaminoethyl 3-phenylsalicylate picrate,
$\beta$-diethylaminoethyl 5-phenylsalicylate picrate,
$\beta$-dimethylaminoisopropyl 3-phenylsalicylate·HCl,
$\beta$-diethylaminoethyl 3-phenylsalicylate bitartrate,
$\beta$-diethylaminoethyl 3-phenylsalicylate dichloroacetate,
$\beta$-diisopropylaminoethyl 5-phenylsalicylate·HCl,
$\beta$-diethylaminoethyl 5-phenylsalicylate hydrobromide,
$\beta$-diethylaminoethyl 3-phenylsalicylate mandelate,
$\beta$-diethylaminoethyl 3-phenylsalicylate hydrobromide.

The shampoo compositions of the present invention are used in the management of seborrhea by wetting the hair and scalp and washing thoroughly with the shampoo, then rinsing with water and repeating the shampooing and rinsing steps. The shampoo may be left on for several minutes. Suggested frequency of application is twice a week.

The shampoo compositions have been found to be cosmetically acceptable, easily applicable, and effective for relief of itching and the clearing of seborrheic scaling of the scalp in the great majority of cases tested, and no evidence of dermatitis venenata, conjunctivitis or inflammation has been observed.

What is claimed as the invention is:

1. A shampoo composition useful in the management of seborrhea of the scalp which comprises a foaming-type shampoo containing a detergent selected from the group consisting of soap and anionic synthetic detergents having incorporated therein as the active ingredient an effective amount of a non-toxic, water-soluble salt of a compound having the formula

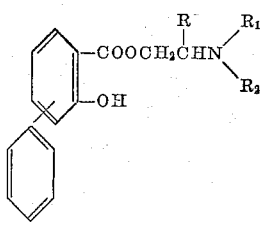

wherein

R is selected from the group consisting of hydrogen and methyl; $R_1$ and $R_2$ are each selected from the group consisting of methyl, ethyl and isopropyl; and, wherein the phenyl group is attached to the salicylate ring at a position selected from the 3, 4 and 5 positions of the salicylate ring.

2. The process of alleviating conditions caused by seborrhea of the scalp which comprises shampooing the scalp with a foaming-type shampoo containing a detergent selected from the group consisting of soap and anionic synthetic detergents having admixed therein an effective amount of a non-toxic, water-soluble salt of beta-diethylaminoethyl 3-phenylsalicylate.

3. A shampoo composition useful in the management of seborrhea of the scalp which consists essentially of a foaming-type anionic detergent composition having incorporated therein approximately one percent of a water-soluble, non-toxic salt of beta-diethylaminoethyl 3-phenylsalicylate.

4. The composition of claim 3 wherein the salt is beta-diethylaminoethyl 3-phenylsalicylate hydrochloride.

5. A shampoo composition useful in the management of seborrhea of the scalp which consists essentially of a foaming-type anionic detergent composition, at a pH 5.0–7.0, having incorporated therein approximately one percent of a water-soluble, non-toxic salt of $\beta$-diethylaminoethyl 3-phenylsalicylate hydrochloride.

References Cited in the file of this patent

UNITED STATES PATENTS

| | | |
|---|---|---|
| 1,976,922 | Christiansen et al. | Oct. 16, 1934 |
| 2,594,350 | Sahyun | Apr. 29, 1952 |

OTHER REFERENCES

Sagarin: Cosmetic Science and Technology, Interscience Publ., Inc., N.Y. (1957), pp. 645–648.

Schimmel Briefs, No. 271, October 1957, 1 p.

J.S.C.C., J. of the Soc. of Cosmetic Chemists, 11: 1, January 1960, pp. 40–41.